United States Patent Office 3,015,567
Patented Jan. 2, 1962

---

3,015,567
PROCESS FOR ENRICHING THE L-LYSINE CONTENT OF FOOD AND THE RESULTING PRODUCT
Norman Laurance Hause, West Chester, Pa., and William Haworth Todd, Wilmington, Del., assignors to E. I. du Pont de Nemours and Company, Wilmington, Del., a corporation of Delaware
No Drawing. Filed Mar. 20, 1959, Ser. No. 800,649
5 Claims. (Cl. 99—143)

This invention relates to derivatives of nutritionally essential amino acids, and is more particularly concerned with new L-lysine salts of aliphatic acids and addition of these salts to food to impart improved properties.

Lysine is one of the essential amino acids in animal nutrition. It exists in two enantiomorphic forms of which L-lysine is the species widely occurring in proteins and is the one utilizable by higher animal life for synthesis of new body protein material. Many naturally occurring proteins, such as wheat gluten, are low in protein quality because the proportion of L-lysine is not sufficient for the other amino acids present to be wholly used in the synthesis of new body tissue. The quality of such proteins can be improved by addition of enough L-lysine to provide a nutritional balance of amino acids.

L-lysine is not suitable for direct addition to food because of its physical properties. Instead, it has been added in the form of a lysine compound, usually as L-lysine monohydrochloride. Taste is an instinctive guide in selecting high quality food. Unfortunately, previously known lysine compounds, which are suitable for fortifying foods, are either tasteless or have an objectionable taste.

It is an object of this invention to provide new L-lysine compounds which are suitable for addition to foods to provide supplementary L-lysine and which will also enhance the flavor of food. A further object is to provide food compositions containing such flavor enhancing L-lysine compounds. Other objects will become apparent from the specification and claims.

The new compounds of this invention are members of the group consisting of L-lysine succinate, L-lysine hydrogen succinate and L-lysine hydrogen adipate. L-lysine succinate is the dilysine or normal salt of succinic acid. L-lysine hydrogen succinate and the corresponding adipate are monolysine salts of succinic and adipic acids, respectively. These are included in the generic classification of L-lysine salts of alkane dicarboxylic acids, which have one of the following general formulas where n is an integer:

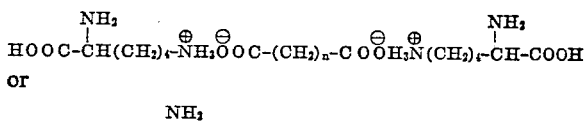

or

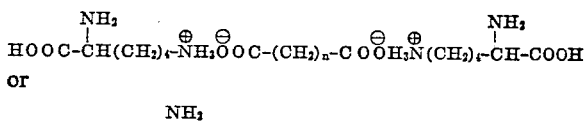

The above salts are prepared by simply mixing L-lysine and the alkane dicarboxylic acid in the desired mole proportions in an aqueous medium, followed by concentration of the resulting salt solution to dryness. All of these salts are believed to be new compounds. However, the three specifically designated above have the unique property of having a desirable salty taste which improves the flavor of food to which they are added. The other members of the generic class do not have a salty taste; they have either substantially no taste or an unappetizing sour taste. It is highly surprising to find such a marked difference in the taste of seemingly related compounds.

The following examples, in which parts are by weight, illustrate preferred embodiments of the invention:

EXAMPLE 1

A solution of 10.68 parts L-lysine in 20 parts water was added to a solution of 4.37 parts succinic acid in 20 parts water. The resulting aqueous salt solution was decolorized with activated charcoal, the charcoal was filtered from the reaction solution, and the clear, colorless filtrate was concentrated to dryness at subatmospheric pressure. The L-lysine succinate product was a white crystalline powder which did not melt, but gradually charred over the range of 200°–250° C. It had a salty taste similar to that of sodium chloride, and was found to be suitable for enhancing the flavor of food.

Analysis.—Theory: C, 46.82; H, 8.29; N, 13.65. Found: C, 46.78; H, 8.63; N, 13.32.

EXAMPLE 2

A solution of 10.68 parts L-lysine in 20 parts water was mixed with 8.61 parts succinic acid and 20 parts water. After decolorizing with charcoal, the clear, colorless solution was evaporated to dryness under reduced pressure. The resulting L-lysine hydrogen succinate was a white crystalline powder which decomposed at 178°–180° C. The taste resembled that of sodium chloride when used for seasoning food.

Analysis.—Theory: C, 45.45; H, 7.57; N, 10.60. Found: C, 45.27; H, 7.63; N, 10.65.

EXAMPLE 3

To an aqueous adipic acid solution, prepared from 20 parts water and 10.66 parts adipic acid, was added a solution of 10.68 parts L-lysine in 20 parts water. The slightly warm solution was swirled at room temperature with charcoal, the charcoal was removed, and the resulting clear solution was concentrated to dryness at subatmospheric pressure. The L-lysine hydrogen adipate salt was a white crystalline powder, melting at 186°–189° C. with decomposition. The product had a salty taste, and was found to be suitable for enhancing the flavor of food in the same manner as sodium chloride.

Analysis.—Theory: C, 49.31; H, 8.21; N, 9.55. Found: C, 49.63; H, 8.29; N, 9.85.

The L-lysine adipate normal salt, prepared as above with 5.40 parts of adipic acid to 10.68 parts of L-lysine, was a white crystalline powder melting at 203°–205° C. with decomposition.

Analysis.—Theory: C, 49.31; H, 8.67; N, 12.83. Found: C, 49.22; H, 8.75; N, 12.97.

In contrast to the salty taste of the monolysine adipate of Example 3, the normal L-lysine adipate is tasteless and does not season food.

L-lysine salts of other organic acids were prepared in a similar manner and found to be completely deficient in any salty flavor. The following table gives the temperate at which each of these compounds melted with decomposition and the ultimate analysis when determined:

Table.—Other L-lysine salts of organic acids which do not have a salty flavor

| L-Lysine Salt Prepared | Decomposition Point, ° C. | Analysis | | |
|---|---|---|---|---|
| | | | Theory | Found |
| Glutarate | 203–205 | C | 48.11 | 48.28 |
| | | H | 8.49 | 8.57 |
| | | N | 13.20 | 12.95 |
| Hydrogen glutarate | 157–160 | C | 47.48 | 47.45 |
| | | H | 7.97 | 7.83 |
| | | N | 10.07 | 10.30 |
| Pimelate | 210–240 | | | |
| Hydrogen pimelate | 165–173 | | | |
| Suberate | 200–240 | | | |
| Hydrogen suberate | 182–186 | | | |
| Azelate | 210–230 | | | |
| Hydrogen azelate | 187–191 | | | |
| Sebacate | 210–250 | | | |
| Hydrogen sebacate | 129–131 | | | |
| Formate | 171.5–173 | C | 43.75 | 43.94 |
| | | H | 8.33 | 8.47 |
| | | N | 14.57 | 14.53 |
| Acetate | 176–178 | C | 46.60 | 46.76 |
| | | H | 8.73 | 8.61 |
| | | N | 13.59 | 13.43 |
| Propionate | 163–166 | C | 49.09 | 49.19 |
| | | H | 9.09 | 9.17 |
| | | N | 12.72 | 12.96 |
| Butyrate | 175–265 | C | 51.28 | 50.88 |
| | | H | 9.40 | 9.55 |
| | | N | 11.96 | 12.01 |
| Hydrogen malate | 184.5–185.5 | C | 42.85 | 42.73 |
| | | H | 7.14 | 7.26 |
| | | N | 10.00 | 9.96 |

The L-lysine succinate, L-lysine hydrogen succinate and L-lysine hydrogen adipate salts of this invention have the unexpected and valuable property of producing a salt-like flavor in foods in combination with the nutritional supplement provided by L-lysine. No previously known lysine derivatives have had this property. These compounds are particularly useful for making food more palatable without increase of sodium salt, or other inorganic salt. The L-lysine component of the salt is useful for building new body tissues and the body is spared the effect of sodium, or other inorganic cations such as the potassium, calcium or magnesium previously used in sodium chloride salt substitutes. The acid component of the salt is burned to carbon dioxide and water.

Since many different embodiments of the invention may be made without departing from the spirit and scope thereof, it is to be understood that the invention is not limited by the specific illustrations except to the extent defined in the following claims.

We claim:

1. A salt selected from the group consisting of L-lysine succinate, L-lysine hydrogen succinate and L-lysine hydrogen adipate.

2. The process for enriching the L-lysine content of food and enhancing the flavor of the food which comprises adding to the food a salt selected from the group consisting of L-lysine succinate, L-lysine hydrogen succinate and L-lysine hydrogen adipate.

3. An L-lysine fortified food comprising a comestible flavored with L-lysine succinate.

4. An L-lysine fortified food comprising a comestible flavored with L-lysine hydrogen succinate.

5. An L-lysine fortified food comprising a comestible flavored with L-lysine hydrogen adipate.

References Cited in the file of this patent

UNITED STATES PATENTS

| 2,824,008 | Perri et al. | Feb. 18, 1958 |
| 2,829,056 | Kemmerer | Apr. 1, 1958 |

FOREIGN PATENTS

| 352,673 | Great Britain | July 16, 1931 |

OTHER REFERENCES

The Chemical Senses, by Moncrieff, Leonard Hill, Ltd., 17 Stratford Place, W.1, London, 1944, p. 356.